Patented Dec. 19, 1950

2,534,306

UNITED STATES PATENT OFFICE 2,534,306

KETENE-ALDEHYDE MODIFIED OILS

Leon Shechter, East Orange, and John M. Whelan, Jr., Lyndhurst, N. J., assignors, by mesne assignments, to Union Carbide and Carbon Corporation, a corporation of New York No Drawing. Application June 8, 1948,
Serial No. 31,847

11 Claims. (Cl. 260—23)

This invention relates to mixed liquid esters of polyhydric alcohols with a plurality of acidic reactants to yield films that air-dry to a hard state and are useful for coatings. Primarily, it is an object of the present invention to improve or "upgrade" slow-drying or "soft" oils, like soya bean and linseed oils, into oils commensurate in drying properties with tung and oiticica oils.

It has been found that a mixed ester or synthetic oil, having markedly improved drying or polymerizing properties and yielding hard and tough films of high alkali and water resistance, can be obtained in the reaction with a polyhydric alcohol of a slow or non-drying oil and a product of ketene with an unsaturated aldehyde when the latter is produced preferably by passing the reactants in about equimolecular proportions into an inert solvent having present therein a catalyst of the Friedel-Crafts or activated clay types and at low temperatures. Under these conditions of preparation the ketene-aldehyde product appears to be largely a polymeric ester, and the unsaturated aldehydes thus found useful are the acrylic series having the general structure $R_1$—$CR_2$=$CR_3$—CHO, wherein $R_1$, $R_2$ and $R_3$ can be hydrogen or monovalent aliphatic, alicyclic, aryl or aralkyl groups; representative aldehydes are acrolein, crotonaldehyde, 2,4-hexadienal-1, octatrienal, cinnamic aldehyde, etc.

For the ketene-unsaturated aldehyde reaction both the temperature and the type of catalyst appear to be directive influences in controlling the character of the product. At temperatures of 60° to 70° C. and an acid catalyst of the X—$SO_3H$ type (X being a non-metallic atom other than hydrogen), acyl-oxydienes (O—C linkage) apparently predominate (Agett, U. S. 2,421,976). Low temperatures of —50° to +30° C. and a Friedel-Crafts catalyst, particularly boron trifluoride, aluminum chloride and zinc chloride, direct the building on of more carbons (C—C linkage) to the aldehyde; other catalysts that operate to yield products of this nature are found to be the clays characterized by containing hydrous aluminum silicate, such as "Attapulgus earth," fuller's earth, etc.

Typical of the general polymeric ester-forming reaction is that of ketene and crotonaldehyde. In the presence for example of about 0.1 to 0.5 gram of boron trifluoride for a mole of reactant and methylbutyl ether as an inert organic solvent (included in amount to control the viscosity) and at a temperature between 5° and 10° C., the reaction product of $$H_3C-CH=CH-CHO + H_2C=CO$$

may be considered under these conditions to be a monomer unit having the C—C linkage

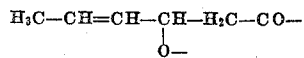

the addition polymer of which is believed to have the structure

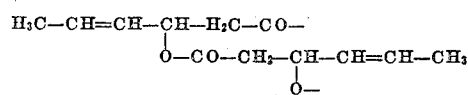

The dangling terminal valences are probably satisfied by the conversion of the carbonyl groups to carboxyls and of the oxygens to hydroxyls, or by unsaturation resulting from dehydration of a so-converted hydroxyl chain end. After the completion of the reaction the catalyst is destroyed by washing the solution with a small amount of water and alkali, when a Friedel-Crafts type of catalyst is used; with the earth type catalyst, it needs only to be filtered out of the solution.

A chemical investigation of the foregoing polymeric product showed very little free monomeric acid (less than 2%) and the presence of polymeric esters of 3-hydroxy-hex 4-en 1-oic and 4- or 5-hydroxy-hex 2-en 1-oic acids. The total yield of polymeric material was in excess of 95 per cent, and hydrogenation thereof yielded about 80 per cent of the six-carbon acids: caproic 40-45 per cent, delta caprolactone 10-15 per cent, trans-hexen-2-oic 15-25 per cent, and other products. These esters were of a low degree of polymerization (probably under 5 and an average of about 2.5). The saponification numbers ( e. g. 628), however, were found to be considerably higher than expected from the polymeric esters (calculated 501), thus indicating some form of terminal carboxyl group reaction with other ingredients present in the mass. That the reaction product, moreover, can be regarded as being primarily a polymeric ester, corresponding to the condensation of the hydroxy group of a hydroxy-monocarboxylic acid molecule with the acid group of another molecule, also appears from the observation that the product reacts much more slowly with glycerol than the acid of the monomer unit.

The improving or upgrading of the oils follows the practice of reacting the oil or its equivalent with the polymeric ester and the polyhydric alcohol, the latter present in amount to give the reduction in acid number that is sought. In this connection it is to be noted that the polymer contributes little to the acid value, either in the processing or in the final product, since the acid groups are largely in an esterified condition as explained above. The marked improvements obtained in the oils by upgrading with the polymer appear to be the result of introducing conjugated unsaturations through dehydrations that permit a high degree of cross linking by carbon-to-carbon linkages rather than ester linkages, and for that reason far more stable.

Glycerol is generally incorporated as the polyhydric alcohol ingredient, but mixtures having a hydroxyl functionality of more than two, such as glycol and glycerol, and the higher alcohols, such as the polyglycols and polyglycerols, erythritol and pentaerythritol and their polymers, arabitol, mannitol, sorbitol, trimethylol propane, polyhydroxybenzenes, etc. yield air-drying oils. Oils, their acids and partial glycerides that can be upgraded include, in addition to linseed and soya bean, perilla, corn, cotton seed, palm, peanut, castor, dehydrated castor, and similar vegetable and fish oils; tung and oiticica oils, though fast drying in themselves, can be improved by the incorporation of the polymeric ester reaction product; illustrative of the fatty acids are those having from 12 to 22 carbon atoms in the chain, such as lauric myristic, palmitic, stearic, linoleic, oleic, eleostearic, licanic, ricinoleic, clupadonic, etc., and the mono- and di- glycerides or other partial alcohol esters of the acids.

The ratio of polymer to oil can be varied over a wide range, but the most useful range is such that the average composition of the improved oil (made with or without solvent) contains from between 0.1 mole of polymer unit (calculated as having a molecular weight equal to that of ketene plus the unsaturated aldehyde) and 0.9 mole of fatty acid per alcohol hydroxyl to 0.66 mole of polymer unit and 0.33 mole of fatty acid per alcohol hydroxyl. Generally about 10 per cent excess of the alcohol is employed over that theoretically required to form the ester, since relatively small quantities of free acid offer points of attack by alkalis and moisture to destroy film continuity.

The examples which follow to illustrate the invention are directed to the inclusion of the polymeric ester derived from the reaction of ketene and crotonaldehyde as a reactant; the procedures outlined, however, apply in exactly the same manner to polymeric esters prepared from ketene and other unsaturated aldehydes of the acrylic series under low temperatures and a Friedel-Crafts or clay type catalyst. The preferred processing is that of reacting in an inert solvent the two acidic ingredients simultaneously with the alcohol; but step reactions, such as causing a preliminary ester-exchange of the oil and the alcohol, and then reacting with the polymer, can be practiced. The particular polymer product generally used in the examples was a solution in isopropyl ether (made with boron trifluoride as a catalyst at 5° to 10° C.) with an acid number of about 138 on solids and an average molecular weight indicating about 2.5 monomer units.

*Example 1*

The proportions selected were such that the final modified oil contained 1 mole of polymer unit (calculated as 112 equivalent weight for each monomer unit) and two moles of fatty oil acids per mol of glycerol (three alcohol hydroxyls).

| | Grams |
|---|---|
| Polymer solution (77% solids) solids | 56.0 |
| Linseed oil (alkali refined) | 293.0 |
| Glycerol, 95% | 20.2 |
| Calcium naphthenate catalyst in xylene (1% Ca content of solution) | 1.6 |
| Xylene | 41.0 |

The foregoing ingredients were charged into a vessel equipped for agitation, $CO_2$ inlet, water decanter and condenser; the calcium naphthenate serves as an ester-interchange catalyst and greatly decreases the reaction time. The charge was heated under an atmosphere of $CO_2$ to reflux in order to drive off the isopropyl ether and water of esterification, the hydrocarbon being returned; the xylene content was adjusted to give a moderate reflux in order to maintain a pot temperature of 205° C. After 10 hours at this temperature the mass was vacuum-distilled at 21 inches mercury to a temperature of 200° C. The final product had an acid number of 2.76 a viscosity E (Gardner-Holdt) and a color 9 (Gardner).

The substitution of soya bean oil in the foregoing reaction in substantially the same molar ratio and processing, with the exception of maintaining a pot temperature of about 240° C., gave after 3¼ hours an oil product with an acid number of 2.37 and color 11 (Gardner).

In both instances films of the synthesized oils per se, which have been bodied to 50 per cent non-volatile in mineral spirits at E viscosity, air-dried (with 0.12% cobalt and 0.3% lead as naphthenate added) to tough, through-hardened resistant films.

These films were much harder and tougher than the unmodified oils under the same processing. As the concentration of the modifier was increased, the rate of hardening increased and the toughness and hardness of film increased.

*Example 2*

The proportions of acidic reactants selected were in the ratio of 0.6 mole of polymer unit to 2.4 moles of oil acids per mole of glycerol.

| | Grams |
|---|---|
| Polymer solution (59% solids) solids | 672.0 |
| Linseed oil (alkali refined) | 7020.0 |
| Glycerol (95%) | 220.0 |
| Calcium naphthenate in xylene (1% Ca metal) | 47.4 |
| Xylene | 500.0 |

The materials were charged simultaneously into the reaction kettle equipped as before, and $CO_2$ was blown through the mass to provide an inert atmosphere. The mass was brought up to refluxing temperature (190° C.) in about 45 minutes with removal of water and return of xylene. Upon increase to about 220° C., the temperature was held for about 2 hours, xylene removed until the pot temperature was about 240° C., and the mass was then held at 240° C. for 8–10 hours or until the acid number was about 6 or lower; the viscosity ranged between E to F (Gardner-Holdt). Vacuum distillation was applied to remove xylene until the temperature reached 280° C. at 24 inches of mercury.

*Example 3*

As an illustration of a low ratio of polymer (0.3 mole of polymer unit to 2.7 moles of fatty acids per mole of glycerol), is a charge consisting of

| | Grams |
|---|---|
| Polymer solution solids | 336.0 |
| Linseed oil (alkali refined) | 7920.0 |
| Glycerol 98% | 111.3 |
| Calcium naphthenate in xylene (1% Ca metal) | 50.2 |

With the same processing as in the foregoing Example 2, an oily product having an acid number of less than 4 and a viscosity of C-D (Gardner-Holdt) was obtainable.

*Example 4*

Illustrative of a high ratio of polymer unit (two molar equivalents to one mole of fatty acid per mole of glycerol) is the following:

| | Grams |
|---|---|
| Polymer solution (41.7% solids) solids | 224.0 |
| Soya monoglyceride | 354.0 |
| Glycerol, 98% | 12.5 |
| Xylene | 28.0 |

The polymer and monoglyceride were first mixed and stirred under $CO_2$ with a raising in temperature to 210° C. in 50 minutes and removal of the isopropyl ether solvent. The glycerol was then added, followed by the xylene in sufficient amount to give a moderate reflux at 220° C.; the water was removed from the reflux return. Refluxing was continued for 2.5 hours, and then a vacuum was slowly applied to strip the xylene. The temperature was raised to 240° C. and a vacuum of 27 inches Hg was attained in 0.5 hour. The vacuum was then broken with $CO_2$, and the batch was allowed to cool to about 140° C., when it was filtered. The product was an oil of acid value 4.35, color 17 (Gardner) and viscosity Z-6+ (Gardner-Holdt).

*Example 5*

A polyhydric alcohol with a plurality of methylol groups on the same carbon atom is trimethylolethylmethane (trimethylolpropane). A modified oil in the ratio of 0.66 mole fatty acid to 0.33 mole of polymer unit for each equivalent of alcohol hydroxyl resulted from a mixture of

| | Grams |
|---|---|
| Polymer solution (clay-catalyzed) solids | 112 |
| Linseed fatty acids | 280 |
| Trimethylolpropane | 134 | by agitation under $CO_2$, distilling off the water of esterification, raising the temperature from 160° to 240° C. over a period of 18 hours, cooling and filtering. The product had an acid number of 7.5 and viscosity of Z (Gardner-Holdt).

*Example 6*

Polyhydric alcohols of a functionality of more than three are incorporated in the following:

| | Grams |
|---|---|
| Polymer solution solids | 448.0 |
| Linseed fatty acids | 5,600.0 |
| Pentek 43 (50 parts of dipentaerythritol and 50 parts pentaerythritol, 43% hydroxyl) | 1,044.0 |
| Xylene | 500.0 |

Agitating the charge under a $CO_2$ atmosphere and heating to reflux and the return of the xylene with a rise in temperature over 11 hours from 190° to 225° C., followed by distilling off solvent to 250° C. and holding for 4 hours, and then cooling, yielded a product of an acid number of 3.25, a viscosity of W (Gardner-Holdt) and a color of 8 L Hellige.

The polymer-modified oils, illustrated by the foregoing examples, can be processed like linseed or the other drying oils into varnishes by cooking with oil-soluble resins, such as the phenolic resins prepared by reaction with formaldehyde of a monohydric phenol carrying alkyl or aryl substituents in one or two of the three reactive positions ortho and para to the hydroxyl on the ring, such as para- tertiary- butyl- phenol, para- tertiary- amyl- phenol, para- phenyl- phenol, etc. It is not necessary, however, that the polymer-modified oil be first prepared for cooking with resin; the modification of the oil can be carried on in the presence of the resin to yield a varnish, all the ingredients being charged at one time into the reaction vessel; or the polymers can be first dispersed in the resins and the mixture then processed with a fatty oil (or its equivalent), interchange catalyst and polyhydric alcohol. Examples illustrative of varnish preparation follow:

*Example 7*

A modification of a fatty oil in the presence of the resin was performed by charging:

| | Grams |
|---|---|
| Polymer solution in ethyl ether (73.9% solids) solids | 110.0 |
| Linseed oil (alkali refined) | 528.0 |
| Glycerol, 98% | 35.2 |
| Ca naphthenate catalyst in xylene (1% Ca content) | 5.7 |
| Para-phenyl phenol-formaldehyde resin | 326.0 |

The mass under a $CO_2$ atmosphere was agitated and heated to 200° C. in one hour with a distillation of the volatiles. In the next two hours the temperature increased to 240° C. and the batch showed an acid number of 40.7; it was held at 240° C. for 12 hours with a reduction in acid number of the solids to 17.6. The temperature was further raised to 280° C. over one hour and held for 2 hours to body the mass, and then cooled and thinned with a hydrocarbon thinner to 43.5 per cent solids with a viscosity of E (Gardner-Holdt). The varnish after the addition of drier (0.1% cobalt and 0.5% lead naphthenates on solids) dried in film form to a slight pressure tack in 4 hours and was hard in 5 hours.

*Example 8*

A polymer solution was added to a resin in the following proportions:

| | Grams |
|---|---|
| Para-phenyl phenol resin | 1,000 |
| Polymer solution (69% in ethyl ether) solids | 344 |

The mixture was agitated, heated to 155° C. and vacuum (24 inches Hg) applied to remove the solvent; this gave a brittle resin product upon cooling with a melt point of 181° C., and a 25 gallon length tung oil varnish made therefrom polymerized in 32 minutes. The product was processed into a soya oil varnish by charging (molar ratio of 1.3 polymer and 1.7 fatty acid)

| | Grams |
|---|---|
| Resin | 134.8 |
| Soya oil, alkali refined | 118.6 |
| Glycerol, 98% | 12.2 |
| Ca naphthenate in xylene 1% Ca metal | 5.3 |

The mass was agitated under a CO atmosphere and heated to 280° C. in 40 minutes and held at 280° C. for 2 hours and 40 minutes. It was then cooled and thinned with hydrocarbon thinner; the acid number (on the solids) was 21.5 and the viscosity was E (Gardner-Holdt). Upon the addition of drier (0.1% cobalt and 0.4% lead naphthenates) the varnish film air-dried in 8 hours to a faint residual tack and dried hard overnight.

What is claimed is:

1. Polyhydric alcohol mixed ester of (1) a monocarboxylic acidic reactant selected from the group consisting of fatty oils, their acids and partial polyhydric alcohol esters of the acids, and (2) a C—C linkage reaction product of substantially equimolar quantities of ketene with an unsaturated aldehyde selected from the group consisting of acrolein, crotonaldehyde, 2,4-hexadienal-1, octatrienal, and cinnamic aldehyde.

2. Mixed ester according to claim 1 in which the alcohol is glycerol.

3. Mixed ester according to claim 1 in which the acid reactant (1) is linseed oil.

4. Mixed ester according to claim 1 in which the aldehyde is crotonaldehyde.

5. Mixed ester according to claim 1 in which the polymeric reaction product (2) when calculated as having a molecular weight equal to that of ketene plus the aldehyde, is present in a molar ratio to the acid reactant (1) that ranges from 0.1:0.9 to 0.66:0.33 per alcoholic hydroxyl.

6. Process of preparing a mixed ester which comprises reacting substantially equimolar quantities of ketene with an unsaturated aldehyde selected from the group consisting of acrolein, crotonaldehyde, 2,4-hexadienal-1, octatrienal, and cinnamic aldehyde at a temperature ranging from —50 to +30° C. in the presence of a catalyst selected from the Friedel-Crafts catalysts and the clays containing hydrous aluminum silicate, and esterifying with a polyhydric alcohol having a hydroxyl functionality of more than two the product as an acidic reactant together with a second acidic reactant selected from the group consisting of fatty oils, their acids and partial polyhydric alcohol esters of the acids.

7. Process of preparing a mixed ester which comprises esterifying with a polyhydric alcohol having a functionality of more than two (1) a C—C linkage reaction product of substantially equimolar quantities of ketene with an unsaturated aldehyde selected from the group consisting of acrolein, crotonaldehyde, 2,4-hexadienal-1, octatrienal, and cinnamic aldehyde and (2) a member of the group consisting of fatty oils, their acids and partial polyhydric alcohol esters of the acids.

8. Varnish comprising an oil-soluble resin and a polyhydric alcohol mixed ester of (1) a C—C linkage reaction product of substantially equimolar quantities of ketene with an unsaturated aldehyde selected from the group consisting of acrolein, crotonaldehyde, 2,4-hexadienal-1, octatrienal, and cinnamic aldehyde and (2) a member of the group consisting of fatty oils, their acids and partial polyhydric alcohol esters of the acids.

9. Process of preparing a varnish which comprises cooking an oil-soluble resin with a polyhydric alcohol mixed ester of (1) a C—C linkage reaction product of substantially equimolar quantities of ketene and an unsaturated aldehyde selected from the group consisting of acrolein, crotonaldehyde, 2,4-hexadienal-1, octatrienal, and cinnamic aldehyde and (2) a member of the group consisting of fatty oils, their acids and partial polyhydric alcohol esters of the acids.

10. Process of preparing a varnish which comprises esterifying in the presence of an oil-soluble resin by means of a polyhydric alcohol with a functionality of more than two (1) a C—C linkage reaction product of substantially equimolar quantities of ketene with an unsaturated aldehyde selected from the group consisting of acrolein, crotonaldehyde, 2,4-hexadienal-1, octatrienal, and cinnamic aldehyde and (2) a member of the group consisting of fatty oils, their acids and partial polyhydric alcohol esters of the acids.

11. Process of preparing a varnish which comprises heating an oil-soluble resin with a C—C linkage reaction product of substantially equimolar quantities of ketene and an unsaturated aldehyde selected from the group consisting of acrolein, crotonaldehyde, 2,4-hexadienal-1, octatrienal, and cinnamic aldehyde, and reacting the product with a member of the group consisting of fatty oils, their acids and partial polyhydric alcohol esters of the acids with a polyhydric alcohol having a functionality of more than two.

LEON SHECHTER.
JOHN M. WHELAN, Jr.

REFERENCES CITED

The following references are of record in the file of this patent:

UNITED STATES PATENTS

| Number | Name | Date |
|---|---|---|
| 1,993,828 | Brubaker et al. | Mar. 12, 1935 |
| 2,421,976 | Agett | June 10, 1947 |